United States Patent [19]

Wilson

[11] Patent Number: 5,396,510
[45] Date of Patent: Mar. 7, 1995

[54] LASER SENSOR CAPABLE OF MEASURING DISTANCE, VELOCITY, AND ACCELERATION

[75] Inventor: Mark L. Wilson, Vadnais Heights, Minn.

[73] Assignee: Honeywell Inc., Minneapolis, Minn.

[21] Appl. No.: 130,054

[22] Filed: Sep. 30, 1993

[51] Int. Cl.6 .............................................. H01S 3/00
[52] U.S. Cl. .................................... 372/38; 356/5.01; 356/28
[58] Field of Search ................... 372/9, 26, 38; 356/3, 356/4, 5, 20–22, 27, 28, 337, 338, 340–343, 349

[56] References Cited

U.S. PATENT DOCUMENTS

| | | | |
|---|---|---|---|
| 4,280,354 | 7/1981 | Wheeler et al. | 73/1 DV |
| 4,453,825 | 6/1984 | Buck et al. | 356/5 |
| 4,611,915 | 9/1986 | Gillard et al. | 356/349 |
| 4,725,841 | 2/1988 | Nysen et al. | 356/5 X |
| 4,833,480 | 5/1989 | Palmer et al. | 342/125 |
| 4,893,077 | 1/1990 | Auchterlonie | 324/207.17 |
| 5,003,260 | 3/1991 | Auchterlonie | 324/207.16 |
| 5,291,031 | 3/1994 | MacDonald et al. | 356/5 X |

*Primary Examiner*—John D. Lee
*Attorney, Agent, or Firm*—Paul H. McDowall; Robert B. Leonard; John G. Shudy

[57] ABSTRACT

A light based distance, velocity and acceleration sensor which uses phase difference to determine the desired measurement. A laser signal is modulated by an oscillator signal and reflected off an object to a signal receiver. The reflected laser signal and the oscillator signal then pass through a dual path conditioning circuit, where the path lengths and circuit elements of the two paths are identical to cancel the effects of propagation delays in an output signal. The conditioned signals are passed through a phase comparator, to produce a signal indicative of the phase difference between the oscillator signal and the reflected laser signal. The phase difference is directly proportional to the distance between the sensor and the object.

10 Claims, 4 Drawing Sheets

LASER SENSOR CAPABLE OF MEASURING DISTANCE, VELOCITY, AND ACCELERATION

BACKGROUND OF THE INVENTION

This invention relates to distance sensors, and more particularly to sensors which receive bounced radiated signals from an object, whose distance from the sensor, velocity or acceleration is to be measured.

Many different ways to measure distances are known. Items such as rulers, yard sticks and tape measures can be used where short distances, generally under one hundred feet, are involved and where it is possible to physically get to the two locations between which a measurement is to be made. However, there are some instances where use of one of these devices is impractical, for example over long distances, where access is not possible, or where measurements are to be made such a great number of times that human participation is undesirable.

To overcome this problem, distance sensors which radiated an object with a signal were created, such as radar and ultrasonic sensors. The both radar and the ultrasonic sensors operated on a similar principal. A base unit created and transmitted a signal toward an object whose distance was to be measured. The signal was reflected by the object back to the base unit which then determined how much time elapsed between transmission of the signal and return of the signal. The signal propagation rate was known or could be calculated, thus leaving a simple calculation to determine the distance between the base unit and the object.

However, the sound or radar signal may bounce off of objects other than the one to be measured thus providing an erroneous return signal. In addition the shape and structure of the object may cause a complete loss of signal so that no measurement can be made.

To this end, light based sensors have been developed. One well known version of a light based sensor are laser speed detectors used by the police to determine the speed of vehicles. These laser speed detectors work in substantially the same way as described above in that the time of travel from the base unit to the object and back to the base unit is used to determine the distance of the object, and two such readings are used to determine velocity.

While this represented an improvement over the previously described detectors, problems still remained. For example, it is difficult over small distances to determine travel time of the laser signal to the object and back due to the speed of the laser signal. This difficulty causes such detectors to be complex and expensive.

SUMMARY OF THE INVENTION

The present invention is a lower cost laser sensor for determining the distance to an object. The laser sensor is made of readily available parts, some of which are used in compact disc technology.

The laser sensor is comprised of a laser, which is collimated to a coherent beam using a lens. The laser is modulated by an oscillator, preferably at a rate of 10 to 200 Mhz.

Reflected light is collected by a second lens and focused onto a receiver which produces a first output signal. The first output signal is conditioned as is the oscillator signal, through a conditioning circuit having identical path lengths for both signals to eliminate propagation delays. The conditioned first output signal and the conditioned oscillator signal are then passed to a phase comparator for a determination of phase difference between the two signals. The phase difference is proportional to the distance to the object. By measuring the phase difference accurately, the distance to the object can be calculated.

The speed of an object or the rate of acceleration of the object can be calculated. A second laser signal is sent to the object after a known delay from the first signal, and the distance from the base unit again is calculated. The difference in distance over the known delay time yields the velocity. To determine acceleration, the difference between two velocities over a known delay is determined.

DETAILED DESCRIPTION OF THE PREFERRED EMBODIMENT

Figure 1:
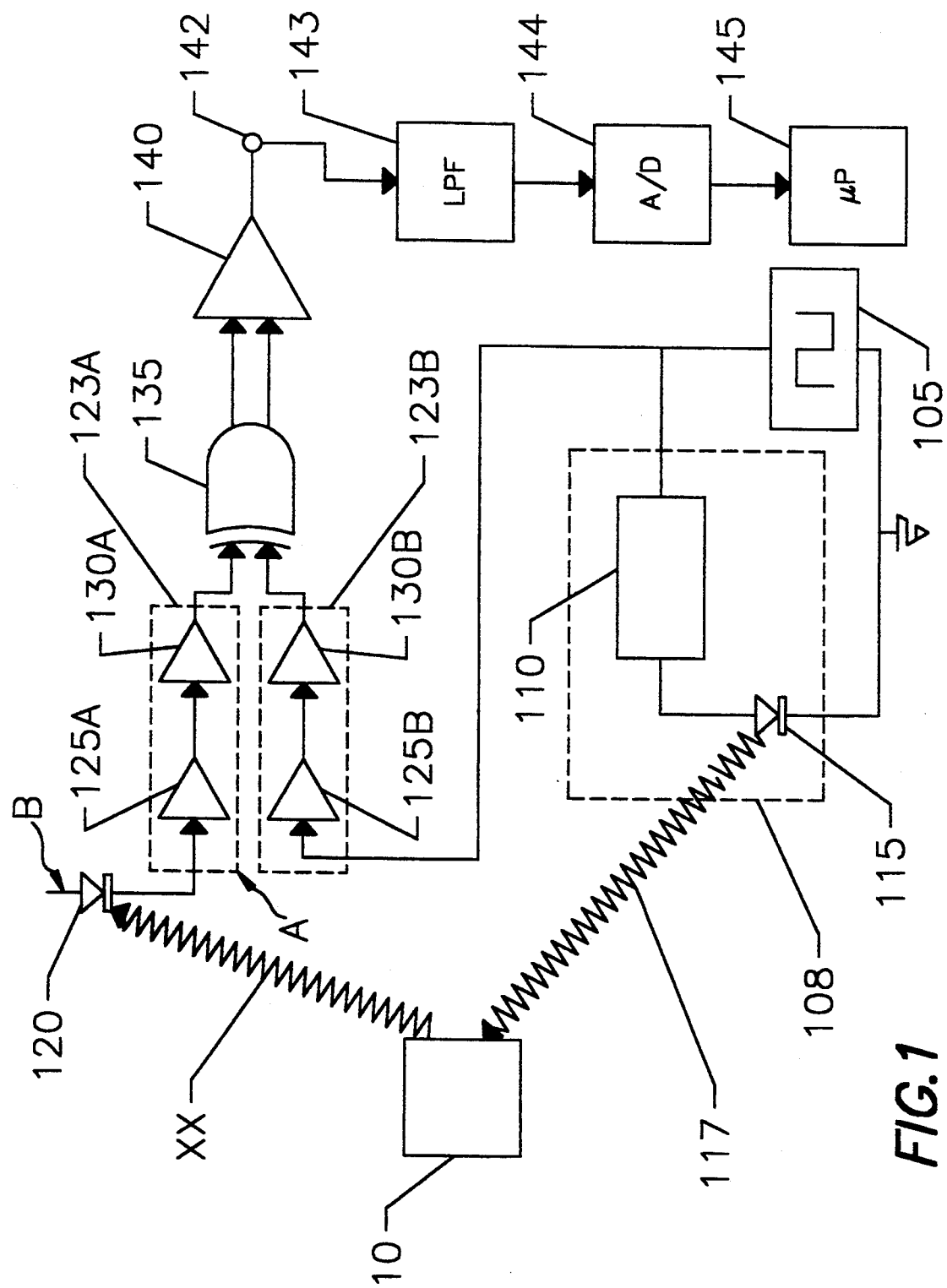
FIG. 1 is an electrical block diagram of the inventive sensor, along with a sample object.

Referring now to FIG. 1, thereshown is a block diagram of the inventive laser sensor 100. The laser sensor includes oscillator 105, laser 108, receiver 120, signal conditioning circuit 122, phase comparator 135 and microprocessor 145.

In operation, oscillator 105, which may include a crystal clock, produces a periodic signal such as a square wave or a sine wave. The oscillator is connected to the laser 108 to modulate the laser signal. The oscillator is also connected to the signal conditioning circuit 122.

Figure 3:
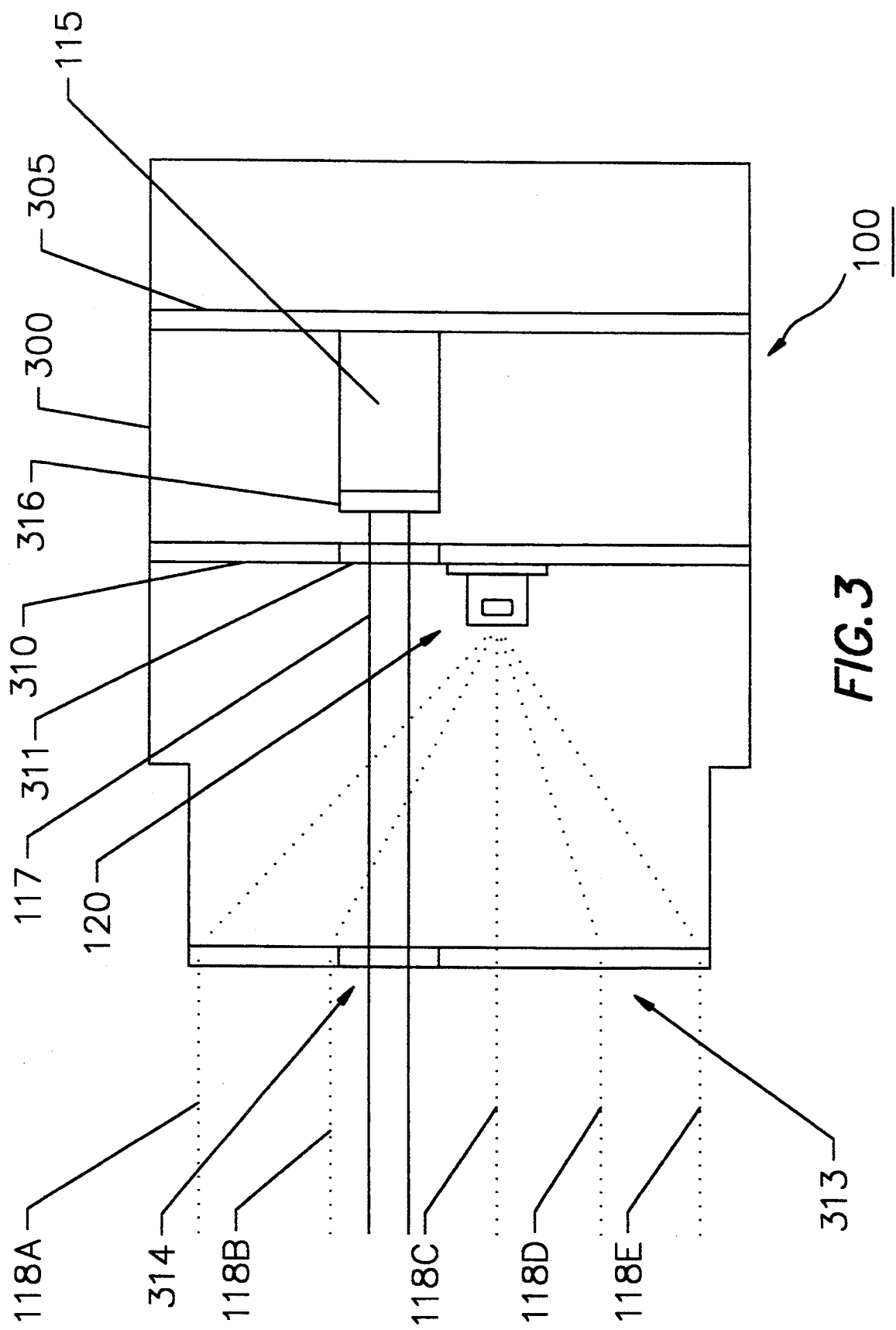
FIG. 3 is a plan view of one laser sensor unit

The laser, in a preferred embodiment, consists of a laser driver 110 and a laser diode 115. These parts are chosen for their low cost and wide availability. The laser produces a laser signal 117 which may be collimated by a lens (316) as shown in FIG. 3.

After the laser signal has been reflected by an object 10, a reflected laser signal 118 is sensed by the receiver 120. In this case, an avalanche photodiode (APD) has been chosen as the receiver. The APD converts the optical signal to an electrical signal. This type of diode was chosen because it operates as an automatic gain control (AGC) to adjust for different reflectivity, shapes and colors of the target object. Conventional AGC electronics can readily adjust for variations in the amplitude of signals, but do not maintain the phase integrity of the signal. Thus, as the color changes, or as an object tipped away from the sensor, the sensor would misinterpret this as a motion even though the object did not move relative to the sensor. The APD allows the detected optical signal to have a variable gain with over a 30 dB dynamic range, and do so without changes to the phase of the signal. The amplified signal from the object leg of the circuit is sampled, and used to provide feedback that adjusts the bias voltage applied to the APD. This in turn, allows the optical signal to experience a gain that ranges from 1 to over 1000 (thus the above noted 30 dB range). This closed loop bias control also eliminates temperature drift problems usually associated with APD optical receivers. It was found that by monitoring the bias voltage applied to the APD, a very weak gain-phase relationship could be compensated. This weak relationship comes from the variation of the capacitance of the APD as the width of the depletion region is increased with increased bias voltage. The weak bias error and temperature errors were corrected using a multidimensional lookup table in computer memory.

In order to measure an object to a resolution of 1 mm, the time difference that would have to be measured would have to be about 7 Pico seconds. This is a difficult task even with expensive high speed electronics. The reflected laser signal, however, will have the same frequency but a different phase from the original oscillator signal. The present invention determines the distance to the object by measuring the phase difference between the reflected laser signal and the oscillator signal using relatively inexpensive and readily available parts. The output of the receiver 120 is connected to the signal conditioning circuit 122 having first and second paths 123A, B respectively. The two separate paths are used to individually condition the reflected laser signal and the oscillator signal. In a preferred embodiment, each conditioning circuit path includes an amplifier 125A, B, and a comparator 130A, B for converting the analog detector signal to a digital signal. Normally, the oscillator signal could be used without any conditioning. However, this circuit is constructed so that both the reflected laser signal and the oscillator signal have exactly the same path length to travel, thus errors in the ultimate output signal due to signal propagation differences are eliminated.

Figure 2:
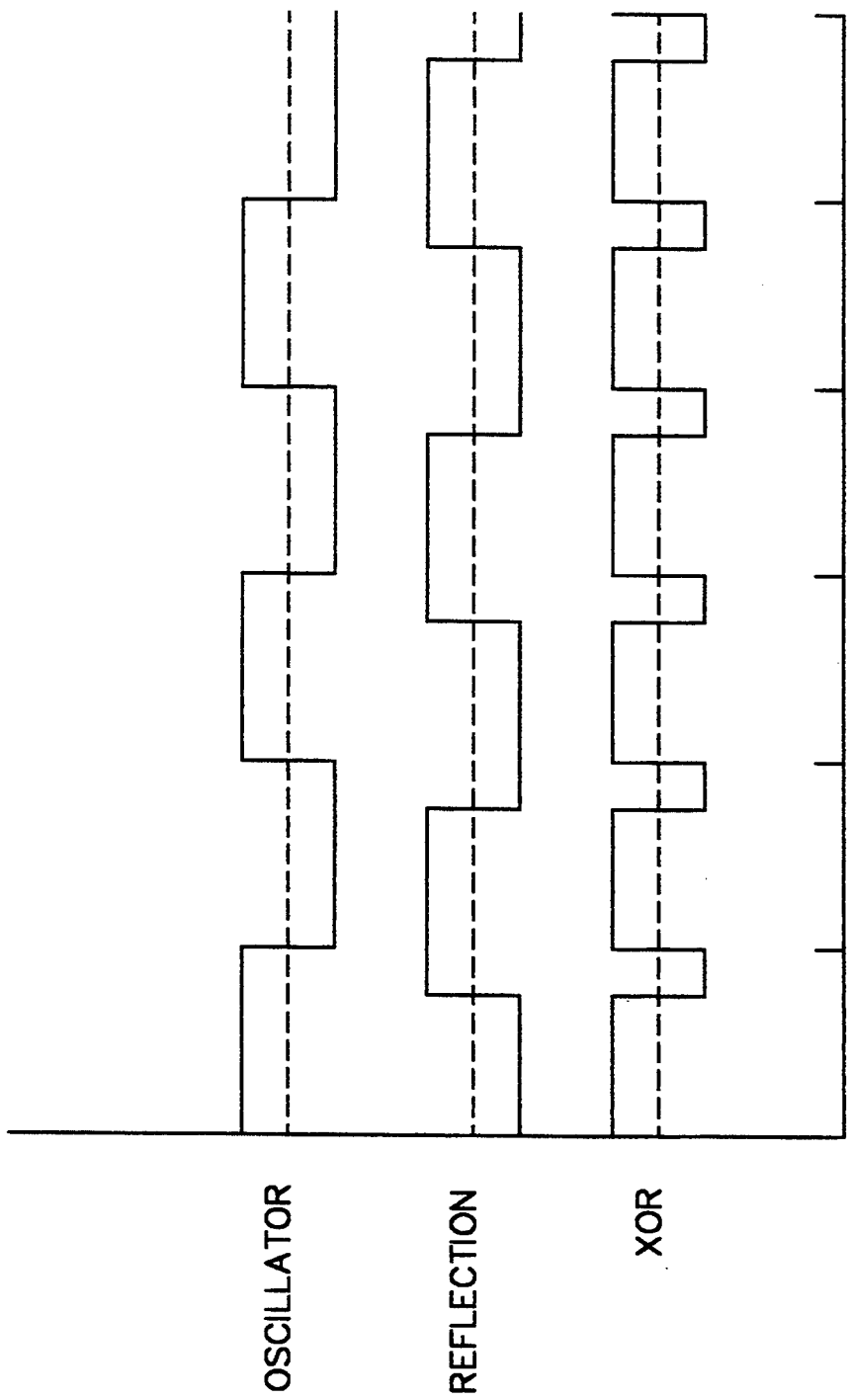
FIG. 2 is a timing chart showing the state of various signal within the sensor.

The two paths 123A, B of the signal conditioning circuit connect to a phase comparator. Here, an exclusive or (XOR) gate, preferably of the high speed silicon ECL type, is used as the phase comparator due to low cost and high availability. The output signal is then a pulse width modulated (PWM) signal. FIG. 2 shows a sample comparison of the oscillator signal (top) the reflected laser signal (middle) and the output signal of the XOR gate.

The PWM signal is then passed through an amplifier 140, a low pass filter 143 for converting the PWM signal into an analog signal that can be monitored with an analog to digital converter 144 before being processed by processor 145 which may be a microprocessor. The digital PWM signal could be directly input into the microprocessor to save the cost of an A/D converter. However, the microprocessor clock speed would have to be higher than the modulation frequency of the laser in this instance.

The phase shift or delay will be directly proportional to twice the distance to the object. The constant of proportionality is inversely proportional to the speed of light. Thus the time difference is (Delta) $(t) = (2d)/(c)$ and the phase difference is (Delta) $(Phi) = (4\ Pi\ d)/c$ where d is the distance to be measured and $c = 3 \times 10^8$ m/s, Delta means the difference in time or phase and Phi is the phase angle.

To calculate velocity of the object, if desired, distance measurements taken at a known time interval can be stored, and the velocity determined having the processor divide the difference in distance by the time interval. Alternatively, a differentiator could be used to perform this task.

To calculate the acceleration of the object, if desired, the difference between two velocities over a known time interval could be calculated by the processor. Here again, a differentiator could be used to perform this task as well.

Referring now to FIG. 3, thereshown is a side plan view of a preferred layout for the inventive sensor 100. Housing 300 supports board 305, board 310 and fresnel lens 313. Laser diode 115 is mounted on board 305. Lens 316, which is preferably a Gradient Index (GRIN) lens, collimates the light leaving the laser diode 115 into the laser signal 117, which is a coherent beam. In a preferred embodiment, board 310 includes a passage 311 through which the laser signal passes.

After bouncing off the object, the light may be scattered as shown by signals 118A-E. The signals are focused on the APD 120 by a lens 313, which may for example be a Fresnel lens. The lens 313, in a preferred embodiment, includes a window 314, through which the laser signal passes.

After the signals are focused on the APD, the APD produces an electrical signal as described above.

Figure 4:
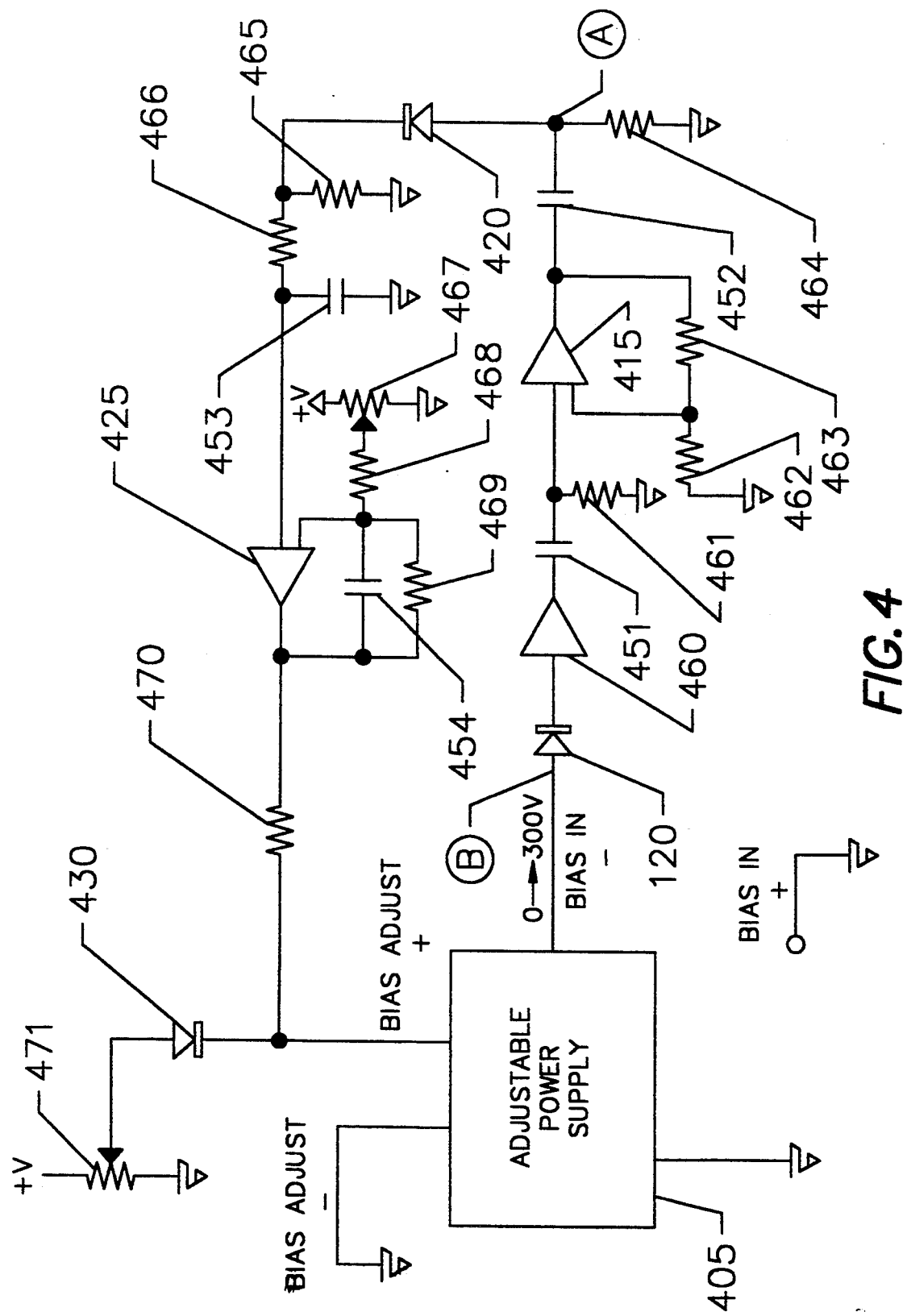
FIG. 4 is a schematic diagram of the Avalanche Photodiode loop used for automatic gain control

Referring now to FIG. 4, thereshown is an example of an Avalanche Photodiode circuit used for automatic gain control. The circuit includes an adjustable power supply 405, an op amp 410, comparator 415, diode 420, comparator 425 diode 430, capacitors 451-454, resistors 461-466 and 468-470 and variable resistors 467 and 471. This circuit is connected to APD 120 at point B as shown in FIGS. 3 and 4.

In operation, the circuit maintains a constant voltage at point A of FIG. 4, which corresponds to point A of FIG. 3. If the APD experiences a drop in the reflected light, such as from a black object, the signal level at point A will drop momentarily until the circuit around comparator 425 changes the bias adjust input to the adjustable power supply 405, which in turn adjusts the APD's voltage to again keep the voltage at point A a constant. The time constant for this change is set by resistor 466 and capacitor 453.

Preferred devices for use in the circuit are: op amp 410-ITA-12318, comparator 415-AD9618, diode 420-1N5711, comparator 425-LF444, diode 430-1N4148, capacitors 451-0.1 f, 452-0.1 f, 453-100 pf, 454-1000 pf, resistors 461-50 Ohms, 462-10 Ohms, 463-1K Ohms, 464-50 Ohms, 465-1K Ohms, 466-10K Ohms, 468-100K Ohms, 469-1M Ohms, 470-10K Ohms and variable resistors 467-Set to 5K Ohms and 471-Set to 5K Ohms.

The foregoing has been an illustrative description of a novel, and non-obvious distance, velocity and acceleration sensor. The applicants define the limits of their property right in the claims appended hereto.

I claim:

1. A sensor for determining a desired characteristic of an object, comprising:
   an oscillator producing a first signal;
   a laser connected to said oscillator, said laser producing a laser signal;
   a receiver for receiving a reflected laser signal from the object, and producing a second signal;
   a conditioning circuit connected to said oscillator and said receiver for producing first and second conditioned signals, said conditioning circuit having first and second conditioning paths for said first and second signals respectively, said first and second conditioning paths having identical circuit elements, said conditioning paths further having identical path lengths;

a phase comparator connected to said conditioning circuit, said phase comparator creating a phase signal representative of a phase difference between said first and second conditioned signals; and a processor connected to said phase comparator, said processor calculating distance to the object based on the phase signal.

2. The sensor of claim 1, wherein said laser comprises:
a laser driver;
a laser diode connected to said laser driver; and
a collimating lens placed in physical proximity to said laser diode.

3. The sensor of claim 2, wherein:
said collimating lens comprises a gradient index lens.

4. The sensor of claim 1, wherein said receiver comprises:
an avalanche photodiode.

5. The sensor of claim 4, wherein said conditioning circuit comprises:
first and second amplifiers connected respectively to said avalanche photodiode and said oscillator; and
first and second comparators connected to said first and second amplifiers respectively.

6. The sensor of claim 1, wherein said phase comparator comprises:
an exclusive or gate having first and second input terminals connected to said first and second conditioning paths and an output terminal at which a pulse width modulated signal is produced.

7. The sensor of claim 6, further comprising:
an amplifier connected to said output terminal of said exclusive or gate;
a low pass filter connected to said amplifier, said amplifier producing an analog signal;
an analog to digital converter connected between said low pass filter and said processor.

8. The sensor of claim 1, further comprising a memory storage device preloaded with a multidimensional lookup table.

9. The sensor of claim 8, wherein said preloaded lookup table bears correction values for compensation of weak bias errors and temperature errors of the laser.

10. The sensor of claim 8, wherein the memory storage device further comprises a RAM portion so that a prior measurement stored therein may be accessed by the processor to calculate a further measurand of the object.

* * * * *